United States Patent [19]
Kohn

[11] Patent Number: 5,875,550
[45] Date of Patent: Mar. 2, 1999

[54] STEER SPINDLE BULLET TOOL

[75] Inventor: Dan Kohn, Wixom, Mich.

[73] Assignee: Freudenberg-NOK General Partnership, Plymouth, Mich.

[21] Appl. No.: 899,229

[22] Filed: Jul. 23, 1997

[51] Int. Cl.⁶ .................................................. B60B 37/10
[52] U.S. Cl. ...................................... 29/898.07; 301/105.1
[58] Field of Search ........................... 301/105.1, 124.1, 301/126, 131, 137; 384/448; 29/898.07, 898.09, 271

[56] References Cited

U.S. PATENT DOCUMENTS

| | | | |
|---|---|---|---|
| 3,537,163 | 11/1970 | Steidl | 29/898.07 |
| 3,824,660 | 7/1974 | Lowe | 29/898.07 X |
| 3,981,513 | 9/1976 | Erskine . | |
| 4,150,468 | 4/1979 | Harbottle . | |
| 4,338,711 | 7/1982 | Wright . | |
| 4,660,500 | 4/1987 | Zeller et al. . | |
| 4,832,413 | 5/1989 | Waggoner . | |
| 4,847,971 | 7/1989 | Gevas . | |
| 4,847,989 | 7/1989 | Franks . | |
| 5,165,156 | 11/1992 | Shultz . | |
| 5,184,402 | 2/1993 | Kadokawa | 29/898.07 |
| 5,209,623 | 5/1993 | Krehnovi . | |
| 5,341,559 | 8/1994 | Reid et al. | 29/898.07 X |
| 5,386,630 | 2/1995 | Fox | 29/898.09 |
| 5,757,084 | 5/1998 | Wagner | 301/105.1 |

*Primary Examiner*—Russell D. Stormer
*Attorney, Agent, or Firm*—Dinnin & Dunn, P.C.

[57] ABSTRACT

A spindle bullet for mounting a hub on a steer spindle of a steer axle. The spindle bullet includes a body member in contact with a reduced diameter portion. The body member includes a circular cavity. A circular channel connects an end of the reduced diameter portion and the cavity.

18 Claims, 5 Drawing Sheets

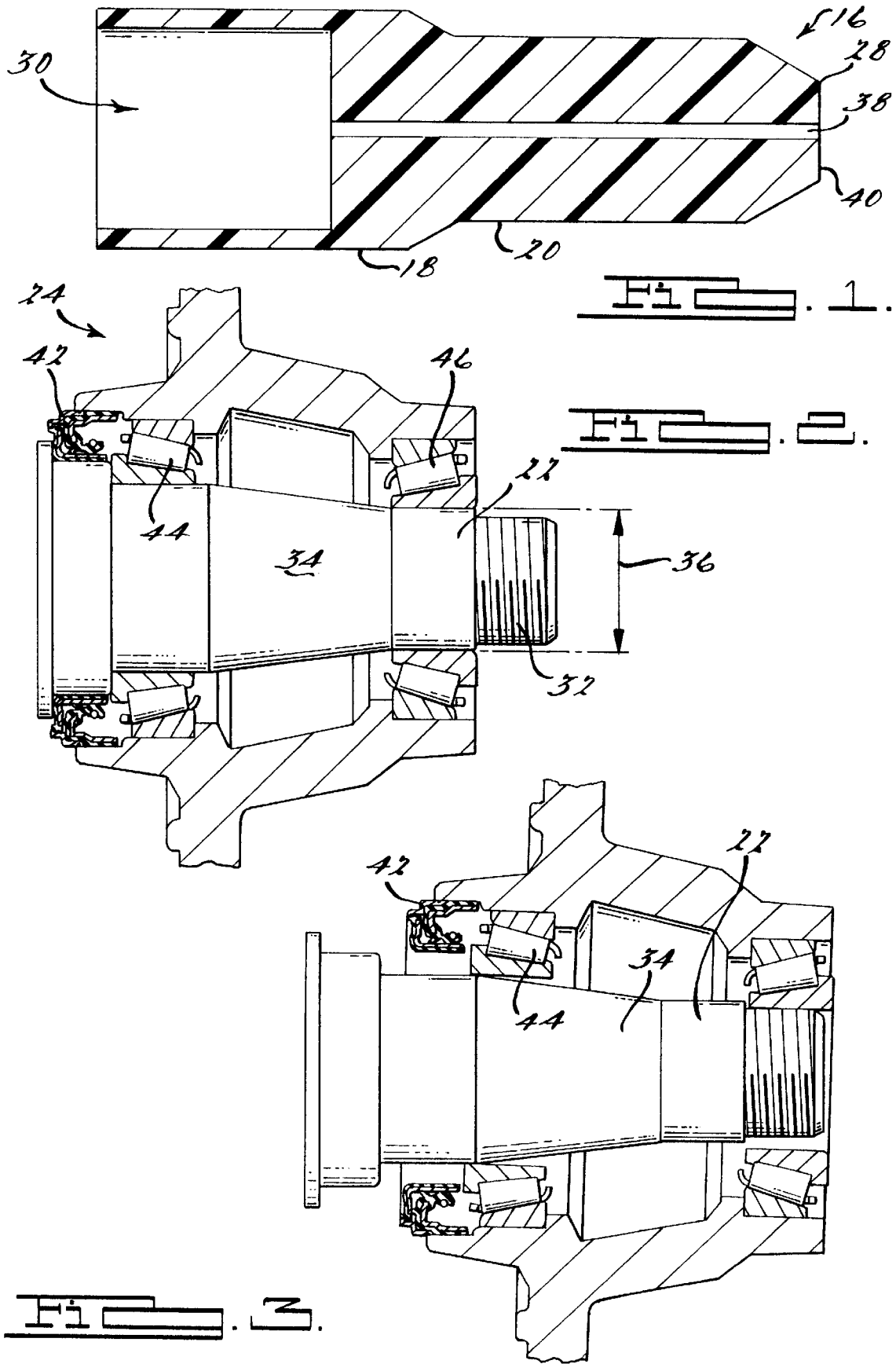

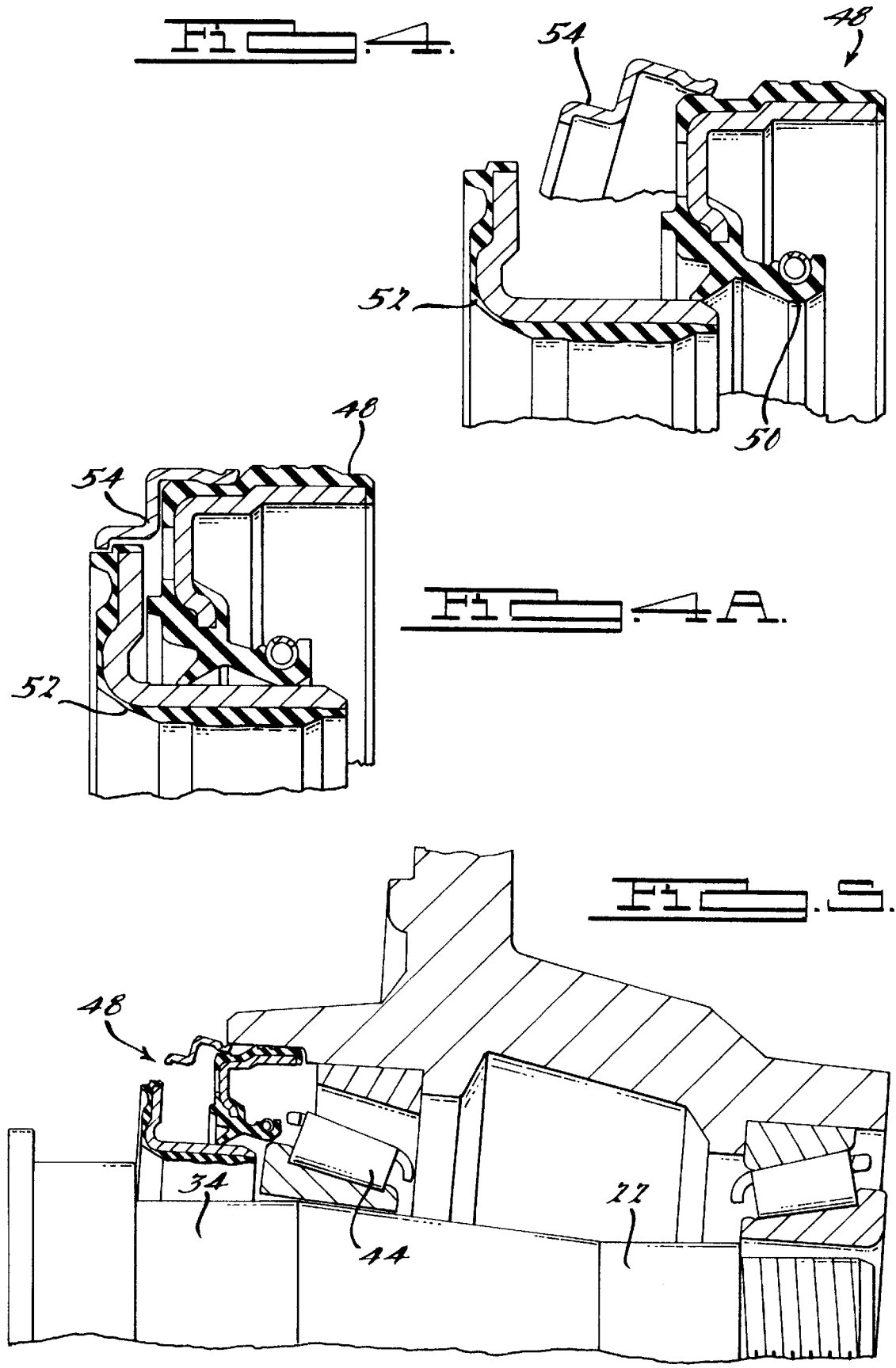

STEER SPINDLE BULLET TOOL

BACKGROUND OF THE INVENTION

1. Field of the Invention

The present invention relates to a steering axle assembly for a motor vehicle, and more particularly, relates to a steer spindle bullet tool used in the steering axle assembly for a vehicle.

2. Description of Related Art

The steering system of a vehicle has a standard hub assembly and spindle. The spindle hub assembly includes a steer spindle, a hub, a seal, an inner bearing and an outer bearing. During the actually assembly of the steering system the inner and outer bearings have to be precisely placed on the spindle and within the hub unit in order for the seal to properly seal the hub unit.

The assembly of the hub currently involves an operator aligning the hub with the spindle and then gently pushing the assembly on to the spindle end. If the hub is not completely centered about the spindle then the inner and outer bearings will not be properly seated and the only available solution to the inner bearing alignment problem is for the operator to rock, in a side to side motion, the hub until the inner bearing is properly seated. Even then it is not a certainty that the hub has been properly seated on the spindle of the steering column.

The prior art has shown the use of an axle bullet for assembling a drive axle and other such applications, however there has never been a device developed in assembling steer spindles and the associated hub in the steering assembly. The axle bullet is placed within the axle, then the rotor and other parts are slid around the axle bullet such that the rotor is properly seated on the end of the axle.

Therefore, there is a need in the art for a device to simplify and insure proper bearing seating for a steer spindle and hub assembly operation.

SUMMARY OF THE INVENTION

One object of the present invention is to provide a steer spindle bullet.

Another object of the present invention is to provide a device for protecting the threads and seal during hub mounting.

Yet a further advantage of the present invention is to provide a device that will pilot the outer bearing to reduce inner bearing hang-up and misalignment during installation of the hub on the steer spindle.

Yet a further object of the present invention is to reduce the occurrence of the seal being off-centered or disassembled.

A further object of the present invention is to provide a device to use with non-traditional hub assemblies such that the device will align a spacer between the inner bearing and outer bearing.

To achieve the foregoing objects the steer spindle bullet includes a body member which has a reduced stepped diameter portion, and a cavity on the opposite end. The spindle bullet also includes a circular channel along the axis of the body member which extends between the cavity and the end of the spindle bullet. The cavity has a predetermined outside diameter and inside diameter.

One advantage of the present invention is that the steer spindle bullet will protect the spindle threads and hub seal during hub mounting.

A further advantage of the present invention is that the steer spindle bullet will correctly pilot the outer bearing onto the spindle in order to reduce inner bearing hang-up or misalignment.

A further advantage of the present invention is that the steer spindle bullet will reduce the possibility of seal misalignment or disassembly within the steer spindle hub assembly.

A farther advantage of the present invention is that with traditional and non-traditional hub assemblies the spacer between the bearings will be properly aligned using the steer spindle bullet.

Other objects, features and advantages of the present invention will become apparent from the subsequent description and appended claims, taken in conjunction with the accompanying drawings.

BRIEF DESCRIPTION OF THE DRAWINGS

FIG. 1 shows a plan view of the present invention.

FIG. 2 shows a standard hub assembly.

FIG. 3 shows a mounting hub under prior art conditions.

FIG. 4 shows the components of the seal within the hub assembly.

FIG. 4A shows the assembled seal of FIG. 4.

FIG. 5 shows a seal assembly within the hub.

Figure 6:
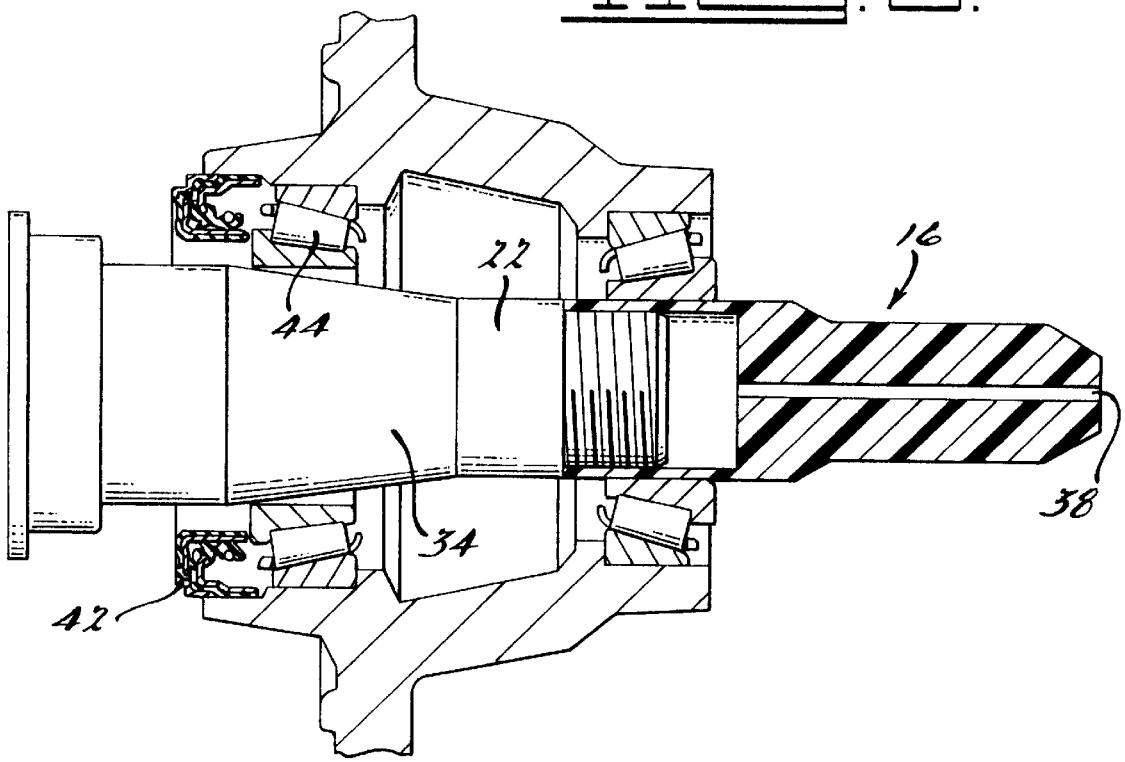
FIG. 6 shows mounting the hub using the steer spindle bullet.

BEST MODE OF CARRYING OUT THE INVENTION AND DESCRIPTION OF THE PREFERRED EMBODIMENT(S)

Referring to the drawings, a steer spindle bullet 16 according to the present invention is shown. The steer spindle bullet 16 generally includes a body member 18 that has a reduced diameter step portion 20. The reduced diameter portion 20 is used as a handle or grip member to place the steer spindle bullet 16 over a spindle 22 and to remove the steer spindle bullet 16 from the spindle 22 once the hub assembly 24 has been completed.

In the preferred embodiment the steer spindle bullet body 18 and handle 20 is made of delrin or acetyl which is similar to a nylon material. However, it should be noted that any other suitable nylon like material with the same hardness may also be used such as UHMW-PE (Ultra High Molecular Weight Poly Ethylene) or any other comparable material.

The steer spindle bullet 16 is made by typical machining and/or any other method known which can shape the nylon like material into the required steer spindle bullet shape. The first reduced diameter portion 20 occurs at a gradual angle wherein the gradual step has an included angle of approximately 30° however, it should be noted that in general the included angle of the first reduced step down portion 26 can be anywhere from between 10° to 50° depending on the application necessary. The end of the handle 20 of the steer spindle bullet 16 includes a second reduced diameter portion 28 the angle at which the reduction occurs is also approximately 30° but it should be noted that any angle from 10° to approximately 60° may be used in shaping the end of the steer spindle bullet handle. The handle 20 in the preferred embodiment has a diameter of approximately 1.375 inches however, it should be noted that any appropriate diameter to fit the hand of the user and/or which is designed for specific use in the environment being used. The handle diameter can be within the range of one half an inch to several inches. The second reduced diameter portion 28 at the end of the handle has a diameter of approximately three quarters of an inch but it also should be noted that any other diameter may be used depending on the overall diameter of the handle such that it is smaller than the diameter of the handle. In the preferred embodiment the handle portion has a length of approximately three inches, but it should be noted that any length greater than 1.25 inches may be used.

Opposite the handle 20 of the body member 18 of the steer spindle bullet 16 is a large cylindrical shaped cavity 30 which is preferably bored out by an appropriate boring tool. The cylindrically shaped cavity 30 is used to place over the threads 32 of a spindle 34 of a steering axle. In the preferred embodiment the body portion 18 of the steer spindle bullet 16 is approximately 2.25 inches long however it should be noted that depending on the size of the spindle this size may vary from a few inches to numerous inches. In the preferred embodiment the cylindrical shaped cavity 30 has a diameter of approximately 1.5 inches plus or minus 0.005 of an inch however, it should be noted that generally speaking the diameter of the cavity will match the spindle thread diameter of the steer spindle being fitted with the hub and bearing assemblies. However it should be mentioned that the tolerances are preferably 0.005 of an inch however it can be up to plus or minus five tenths of an inch. Also in the preferred embodiment the depth of the cylindrical cavity is approximately 1.7 inches however, it should also be noted that depending on the size and shape of the spindle threads being covered the depth may vary from anywhere to a few inches to numerous inches. The outside diameter of the steer spindle bullet body member 18 is approximately 1.75 inches plus or minus 0.005 of an inch in its preferred embodiment however it should be noted that the outside diameter will vary with the diameter of the spindle journal 36. It should also be noted that the tolerances may be anywhere from 0.02 of an inch up to 0.0001 of an inch.

A circular channel 38 extends the entire length of the steer spindle bullet 16 between the end of the handle 40 and the bottom of the cavity 30. The circular channel 38 has approximately a diameter of 0.125 inches and is placed along the axis of the steer spindle bullet 16. It should be noted that any other shape other than circular may be use for the channel and that the dimension of the channel may differ plus or minus two tenths of an inch depending on the needs of the steer spindle bullet 16 and the size of the spindle being protected. In operation the circular channel 38 provides for a pressure release mechanism such that the steer spindle bullet 16 is easily placed upon the spindle thread and removed from the spindle threads without any back pressure or counter pressure adversely affecting the removability of the steer spindle bullet 16. The outside diameter of the body member of the steer spindle bullet 16 is machined to match the dimension of the outer bearing spindle journal 36 such that it creates a parallel intersection between the outer ring spindle journal and the outer circumference of the steer spindle bullet 16.

In operation a centered hub assembly 24 and spindle 34 used on a steer axle include a steer spindle 34, a hub 24, a seal 42, an inner bearing 44, and an outer bearing 46. The hub 24 is placed over the end of the spindle 34 and the seal 42 engages the spindle 34 and keeps fluid from leaking from the hub 24 outside onto the steer axle. The inner bearing 44 is placed against the spindle 34 as the outer bearing 46 is placed at the end of the spindle 34 above the spindle threads 32. To mount the hub assembly 24 onto the steer axle under prior art methods includes the following steps. First, the hub assembly 24 is supported with an overhead crane. Then the operator will align the hub 24 with the spindle 34 and gently move the hub assembly 24 onto the end of the spindle 34. However, it is common that the hub 24 will not center itself upon the spindle 34 correctly which in turn will wedge the inner bearing 44 in an improperly seated manner against the spindle 34. This condition occurs because of the lack of aligning mechanisms between the hub 24 and the spindle 34 and because the clearance between the inner bearing 44 and the spindle journal 36 is very small. Currently, the operator can remedy the wedged inner bearing by either rocking the hub in a gentle side by side motion and in turn walk the bearing on the spindle 34 however, this causes the seal to become cocked within the hub and leads to improper seal position within the spindle 34 and the hub 24, see FIG. 5. The other alternative for the operator is to remove the hub 24 and to try sliding the entire hub assembly 24 on the spindle journal once again in a more centered fashion.

It has to be noted that the seal 42 which is placed within the mounting hub 24 includes a main case 48 which incorporates a seal lip 50, a wear sleeve 52 and retainer ring 54 into a U-shaped seal. The design of this seal 42 is such that if the inner bearing 44 becomes wedged on the spindle 34 because it is off center, as the operator removes the hub off the spindle so as to realign the hub the inner bearing cone will come into contact with the wear seal of the seal thus pushing the retaining ring off of the seal which in turn will completely disassemble the seal further increasing manufacturing costs and time to properly seat the hub upon the spindle journal. Damage may also occur to the seal components thus requiring a new seal and/or components further increasing manufacturing costs.

Figure 7:
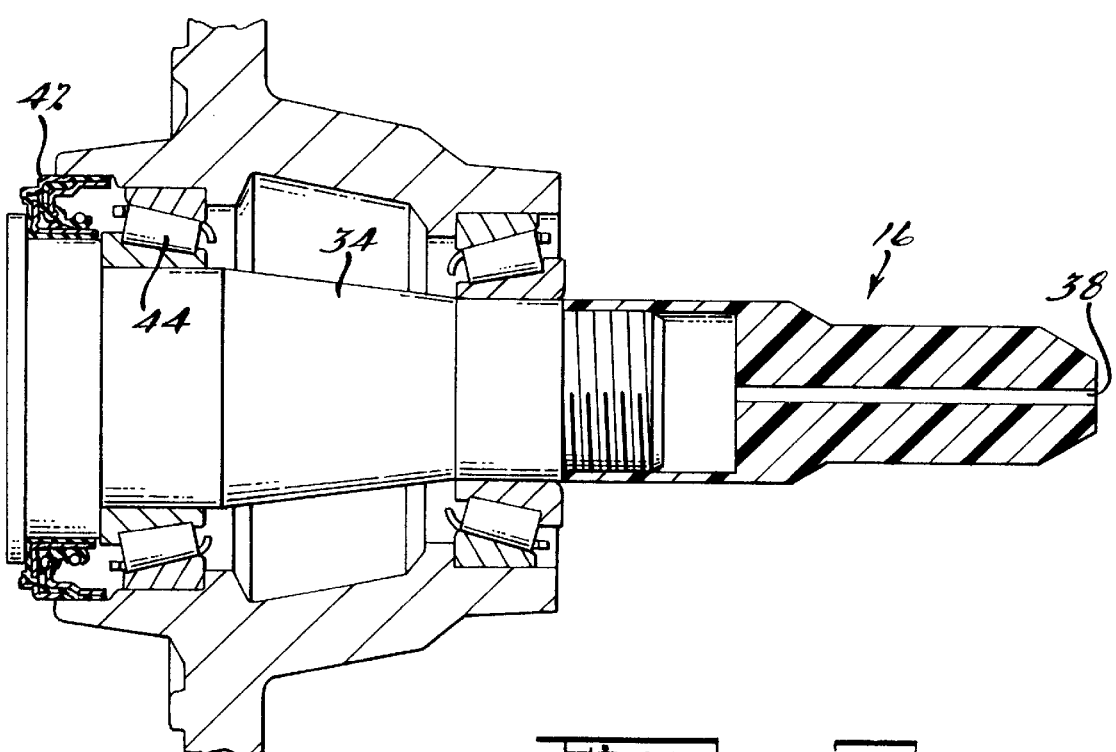
FIG. 7 shows the hub mounted on the spindle using the steer spindle bullet.
Figure 8:
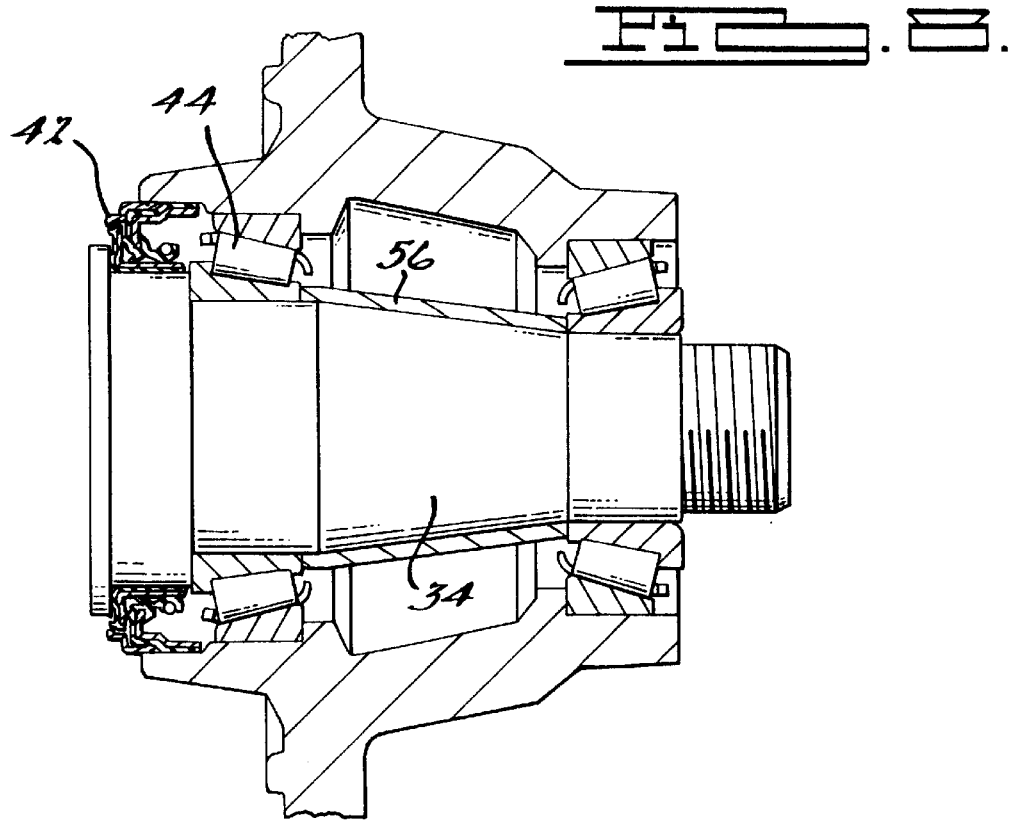
FIG. 8 shows a non-traditional hub assembly.
Figure 9:
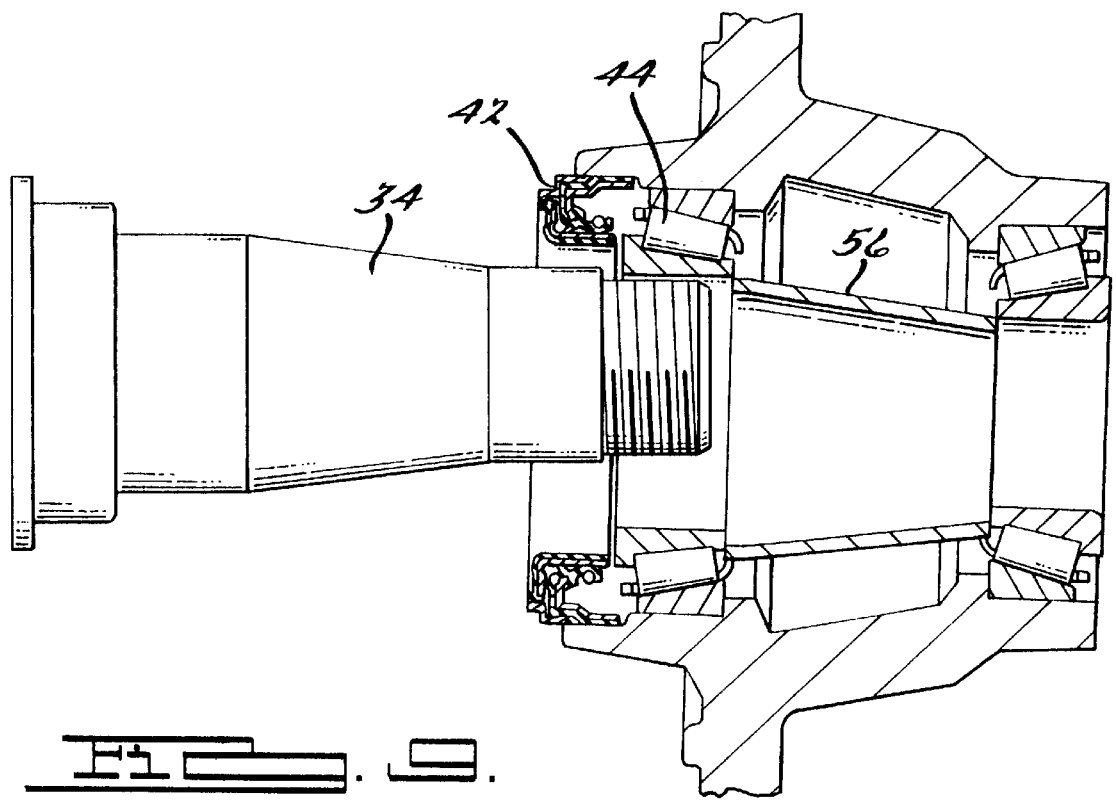
FIG. 9 shows mounting a non-traditional hub assembly under the prior art conditions.
Figure 10:
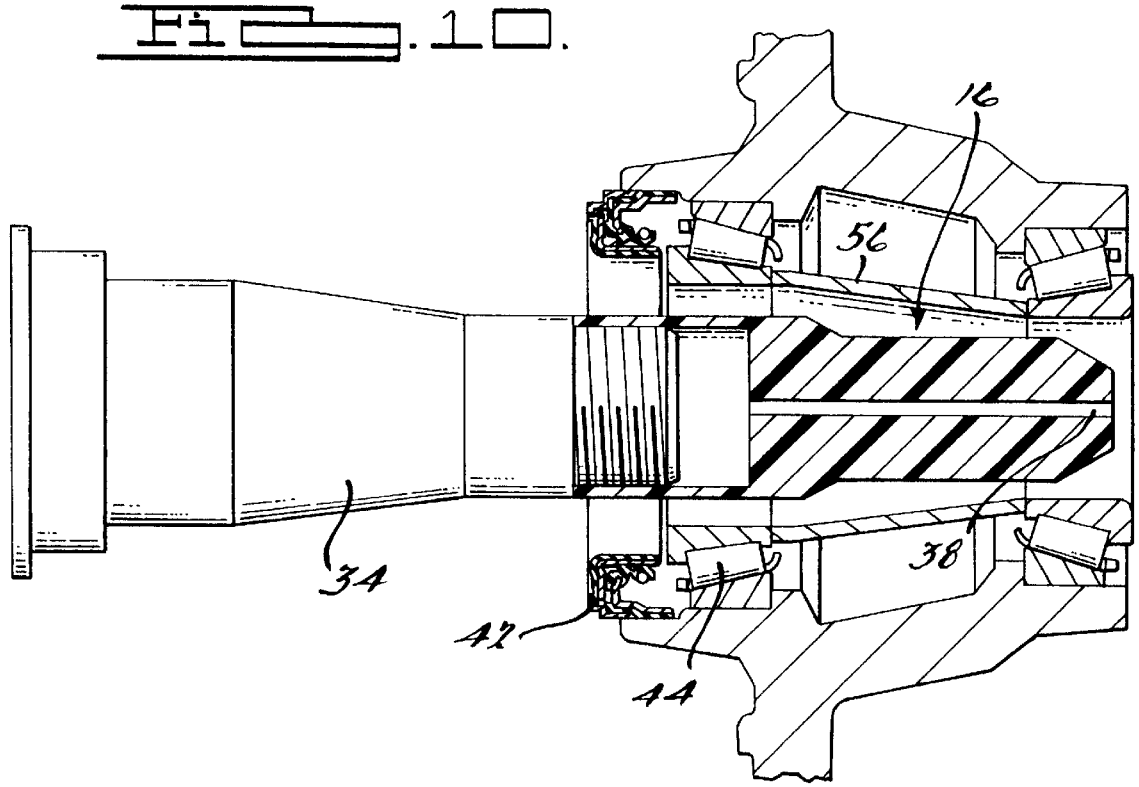
FIG. 10 shows mounting of a non-traditional hub assembly using the steer spindle bullet.
Figure 11:
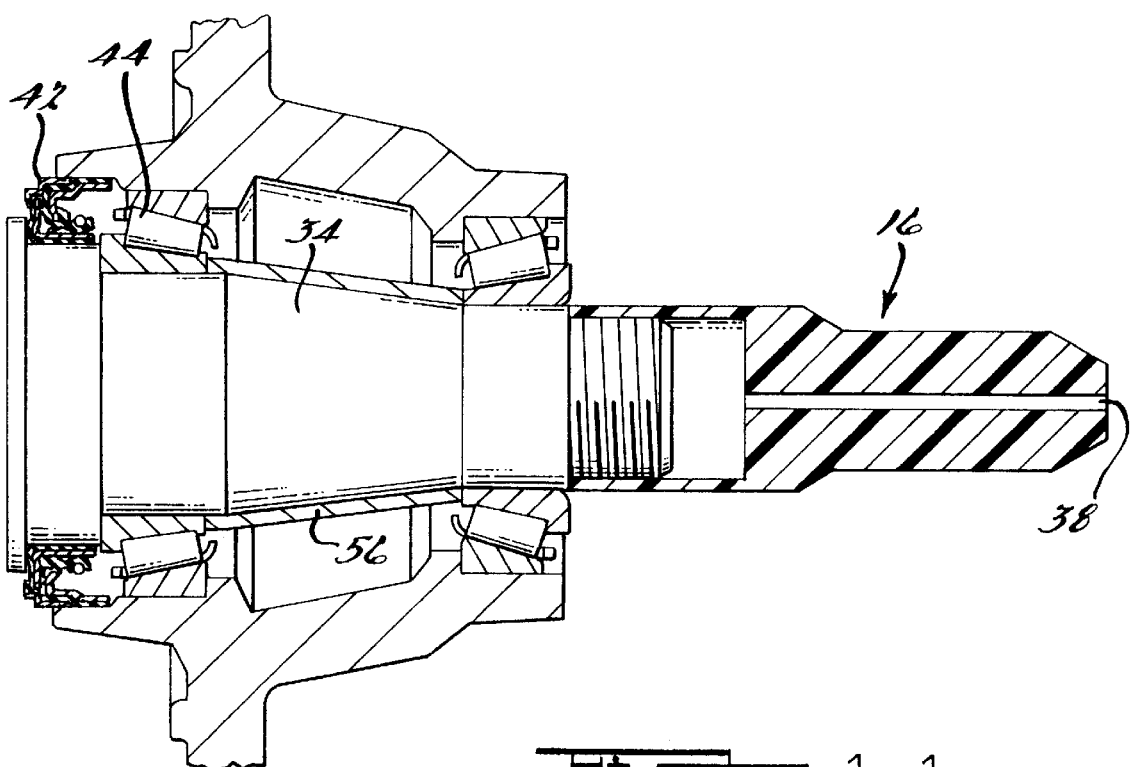
FIG. 11 shows a non-traditional hub mounted on a spindle using the steer spindle bullet.

The mounting of the hub assembly 24 on the steer axle with the present invention steer spindle bullet 16 is done as follows. First, the steer spindle bullet 16 is placed over the steer axle such that the spindle threads 32 are completely covered and that the outer diameter of the steer spindle bullet 16 aligns in a parallel interface with the outer bearing spindle journal 36. Next, the operator will support the hub 24 with an overhead crane and then while securing the outer bearing 46 in the hub 24 will slide the hub assembly over the bullet 16, see FIGS. 6, 7. As the outside diameter of the spindle bullet 16 is exactly the same dimension as the spindle journal 36 the piloting or guiding of the outer bearing 46 begins before the inner bearing 44 comes into contact with the inner bearing journal further upon the spindle 34. This will in effect reduce the possibility of the inner bearing becoming cock-eyed or misseated and wedged on the spindle 34 because the alignment begins before the inner bearing 44 even approaches the spindle 34. This will allow for accurate centering of the hub assembly 24 upon the steer axle and reduce manufacturing cost because of seals that have to be replaced or bearing hub assemblies that had to be placed upon the spindle numerous times.

A non-traditional hub assembly includes a hub 24, a seal 42, an inner bearing 44, a spacer 56 means, and an outer bearing 46. The spacer 56 is placed between the inner and outer bearings (44, 46) and is used to control the preload and any end play of the wheel end in the steer axle. To mount the non-traditional hub assembly the current method includes using an overhead crane and having the outer bearing 46 held in place by hand or a retainer where that retainer is used during assembly and is then removed after the hub is mounted on the spindle 34. When the outer bearing 46 is being held by the operator the spacers 56 are able to drop the hub 24 into the cavity between the inner bearing and the outer bearing. As the operator slides the hub over the spindle the spacer has been known to come into contact with the spindle threads and possibly damage the threads or the spacer 56 and then the operator has to simultaneously align the spacer 56 with the spindle 34 while he is placing the hub onto the spindle. Another problem with the prior art method is that as the hub 24 is under the spindle there is the possibility and likely occurrence of the bearing becoming entangled with the journal on the spindle end of the axle. However, if the steer spindle bullet 16 is used for mounting a non-traditional hub assembly using a spacer 56 the bullet 16 will pilot the outer bearing 46 to reduce the inner bearing hang up and/or misseating and it also protects the threads in the seal from damage by the spacer and also properly centers and aligns the spacer 56 onto the spindle 34 of the steer axle.

The present invention has been described in an illustrative manner, it is to be understood that the terminology which has been used is intended to be in the nature of words of description rather than of limitation.

Many modifications and variations of the present invention are possible in light of the above teachings. Therefore, within the scope of the appended claims, the present invention may be practiced otherwise than as specifically described.

What is claimed is:

1. A spindle bullet, said spindle bullet including:
   a body member, said body member including a reduced diameter step portion, said body member having a cavity at an end;
   a circular channel extending along the axis of the body member, said channel extends between said cavity and an end of said reduced diameter portion, said channel releases pressure for said spindle bullet, said cavity end having a predetermined outside diameter and a predetermined inside diameter.

2. The spindle bullet of claim 1 wherein said body is made of a plastic material.

3. The spindle bullet of claim 2 wherein said plastic material is acetyl.

4. The spindle bullet of claim 1 wherein said reduced diameter portion has a predetermined angle of incline.

5. The spindle bullet of claim 1 further including a second reduced diameter portion.

6. The spindle bullet of claim 1 wherein said spindle bullet has a length between 3 inches and 12 inches.

7. The spindle bullet of claim 1 wherein said outer diameter is between 0.5 inches and 4.125 inches.

8. The spindle bullet of claim 1 wherein said inside diameter is between 0.25 inch and 4 inches.

9. A spindle bullet for use in mounting a hub assembly on a steer spindle, the steer spindle having an outer bearing spindle journal and spindle threads, said spindle bullet including:
   a body member made of a plastic material, said body member having a cylindrical cavity in one end thereof, said body member having a predetermined outside diameter, said cavity having a predetermined diameter and depth;
   a reduced diameter handle joined by a fixed angle step to said body member, said handle having a predetermined diameter;
   a second reduced diameter portion joined by a fixed angle step to said handle;
   a circular channel along an axis of said spindle bullet, said channel extending from said cavity to said second reduced diameter portion.

10. The spindle bullet of claim 9 wherein said spindle bullet has a length of approximately 5.25 inches.

11. The spindle bullet of claim 9 wherein said outside diameter is approximately 1.75 inches.

12. The spindle bullet of claim 1 wherein said inside diameter is approximately 1.5 inches.

13. The spindle bullet of claim 9 wherein said plastic material is acetyl.

14. The spindle bullet of claim 9 wherein said fixed angle step is approximately 30°.

15. The spindle bullet of claim 9 wherein said outside diameter is approximately equal to an outer bearing spindle journal diameter.

16. The spindle bullet of claim 9 wherein said inside diameter is approximately equal to a diameter of steer spindle threads.

17. The spindle bullet of claim 9 wherein said spindle bullet guides bearings onto said spindle and said spindle bullet protects spindle threads.

18. The spindle bullet of claim 9 wherein said channel releases air from one end thereof to facilitate removal of said spindle bullet from the steer spindle.

* * * * *